United States Patent

[11] 3,614,033

| [72] | Inventor | Lewis C. McCarty, Jr.<br>Thornton-le-Dale, England |
|---|---|---|
| [21] | Appl. No. | 737,046 |
| [22] | Filed | June 14, 1968 |
| [45] | Patented | Oct. 19, 1971 |
| [73] | Assignee | Central Aircraft Manufacturing Company, Inc., Washington, D.C. |

[54] TANDEM WING AIRCRAFT WITH FREELY PITCHING WING SURFACES
24 Claims, 12 Drawing Figs.

[52] U.S. Cl. .................................................. 244/48, 40/212
[51] Int. Cl. ..................................................... B64c 3/38, B64c 3/08
[50] Field of Search ........................................ 244/48, 45, 7.3, 89, 46, 49, 119, 17.11; 40/212

[56] References Cited
UNITED STATES PATENTS

| 2,818,226 | 12/1957 | Hiller, Jr. et al. | 244/119 X |
| 1,377,414 | 5/1921 | Ecob | 244/48 |
| 1,608,109 | 11/1926 | Myers | 244/46 X |
| 1,833,280 | 11/1931 | deVezino | 244/48 |
| 1,891,166 | 12/1932 | Leupold | 244/7 (.3) |
| 1,923,725 | 8/1933 | Haines | 40/212 |
| 2,589,994 | 3/1952 | Custer | 244/48 X |
| 2,937,823 | 5/1960 | Fletcher | 244/48 X |
| 3,039,719 | 6/1962 | Platt | 244/7 (.3) |
| 3,064,928 | 11/1962 | Toll | 244/46 |

FOREIGN PATENTS

| 512,764 | 11/1930 | Germany | 40/212 |

*Primary Examiner*—Milton Buchler
*Assistant Examiner*—Jeffrey L. Forman
*Attorney*—Kenyon & Kenyon

ABSTRACT: The lifting surfaces of the wings are freely pivotal to maintain a stable trim and are provided with pilot-actuated flaps for controlling the attitude of the lifting surfaces. The wings are arranged in tandem at the front and rear of the aircraft and enables the fuselage to be of great length. The aircraft is capable of damping out turbulence to a significant large degree while placing large power control forces at the pilot's disposal for maneuvering.

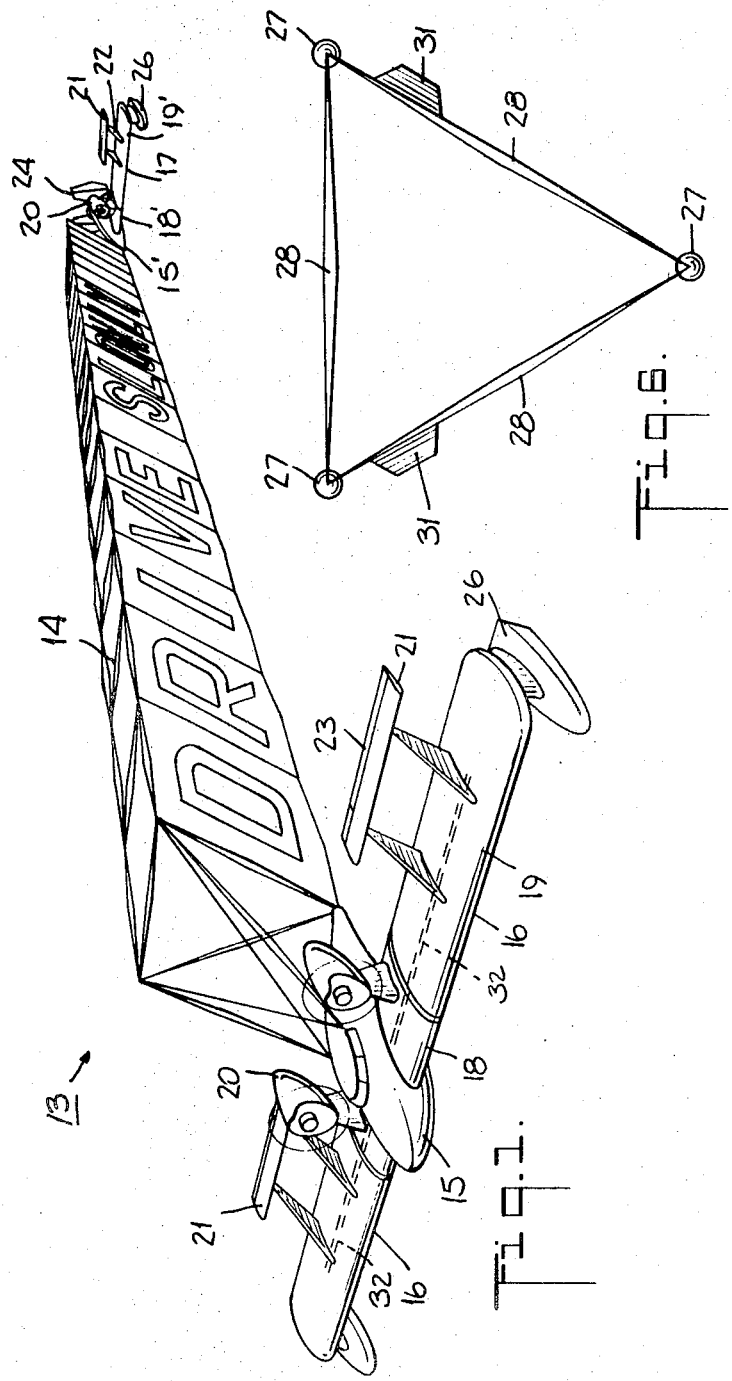
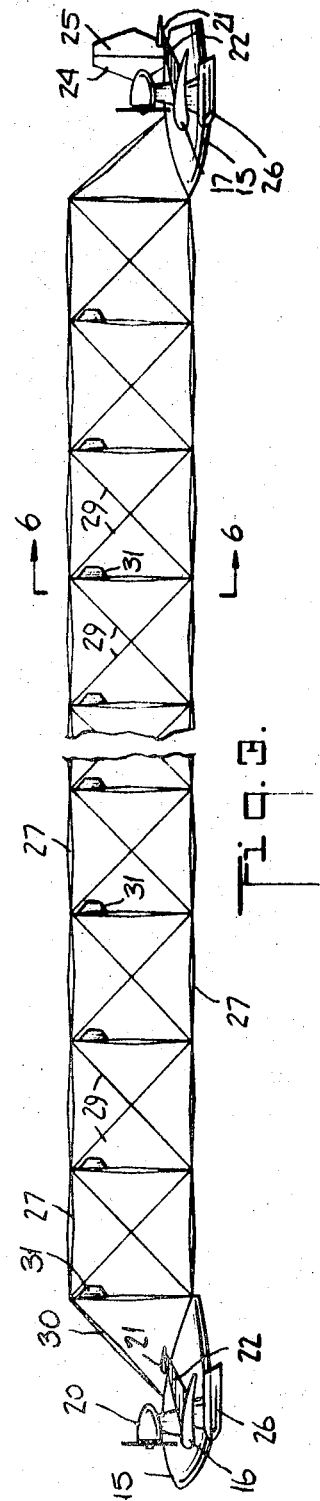

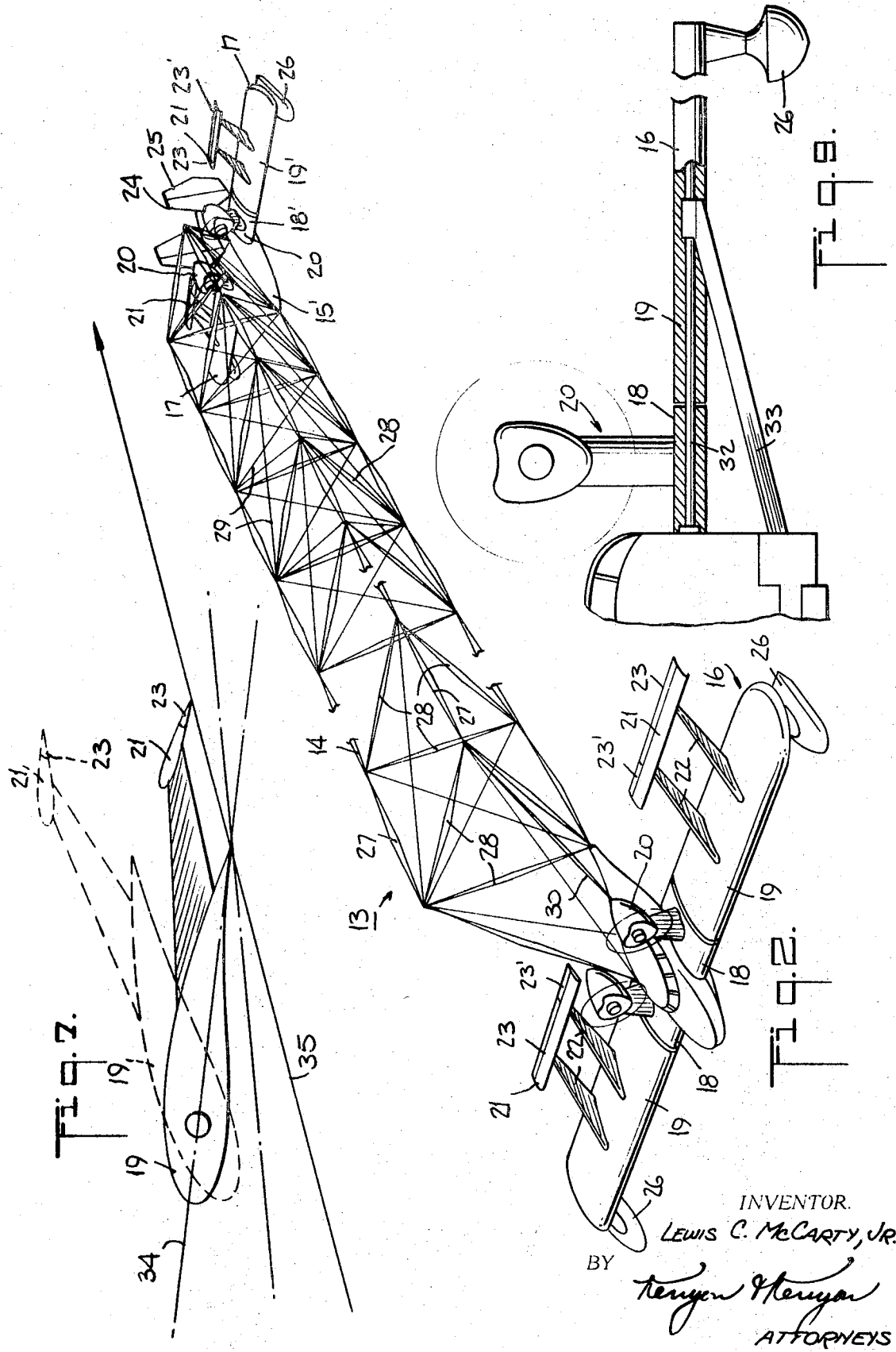

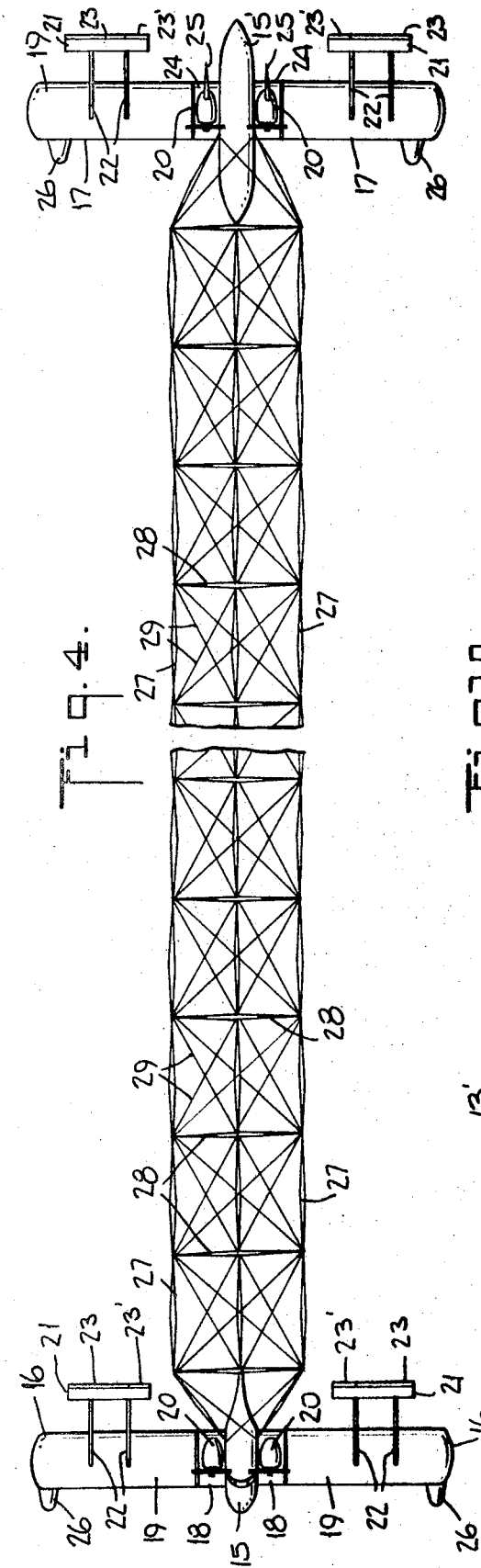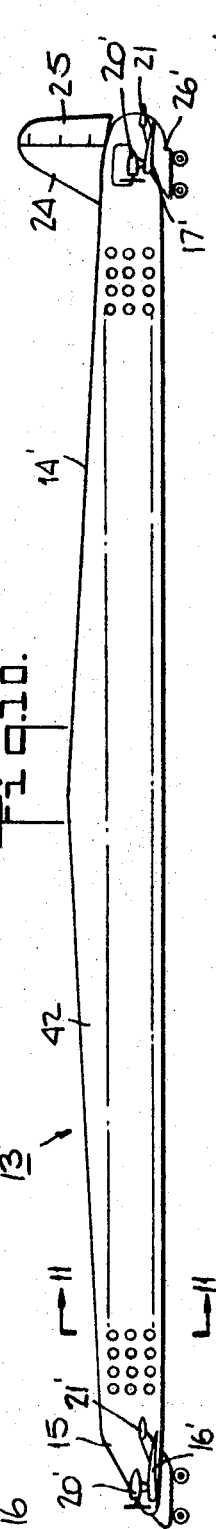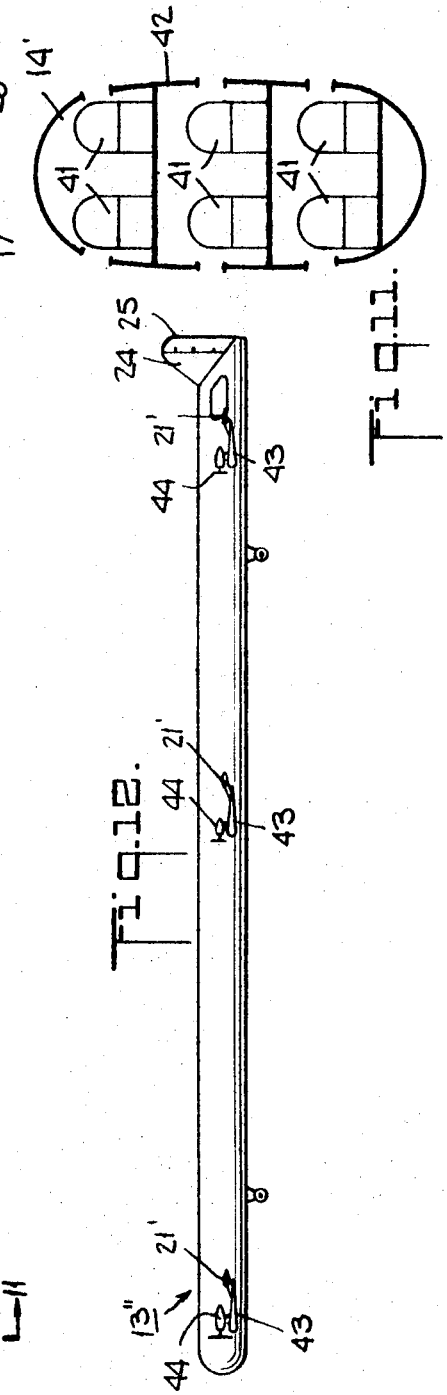

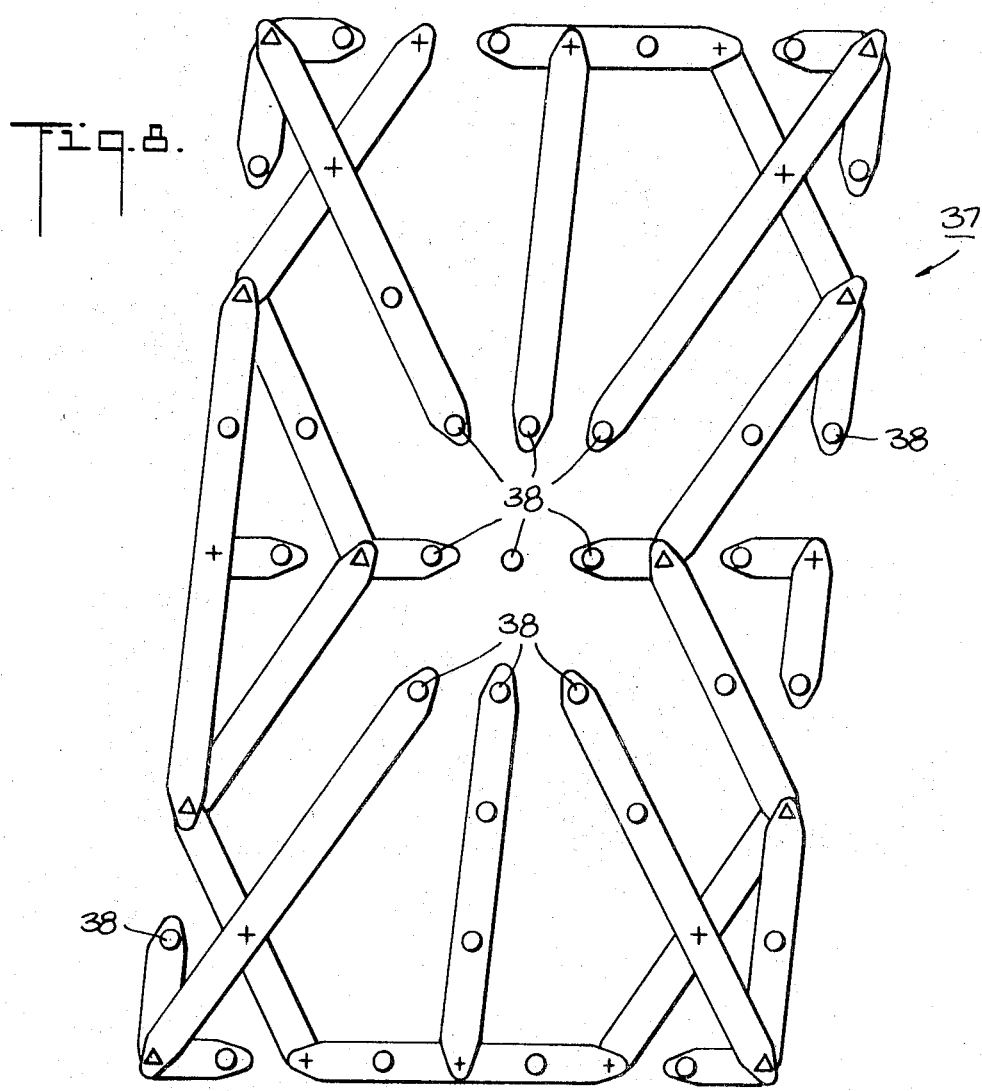
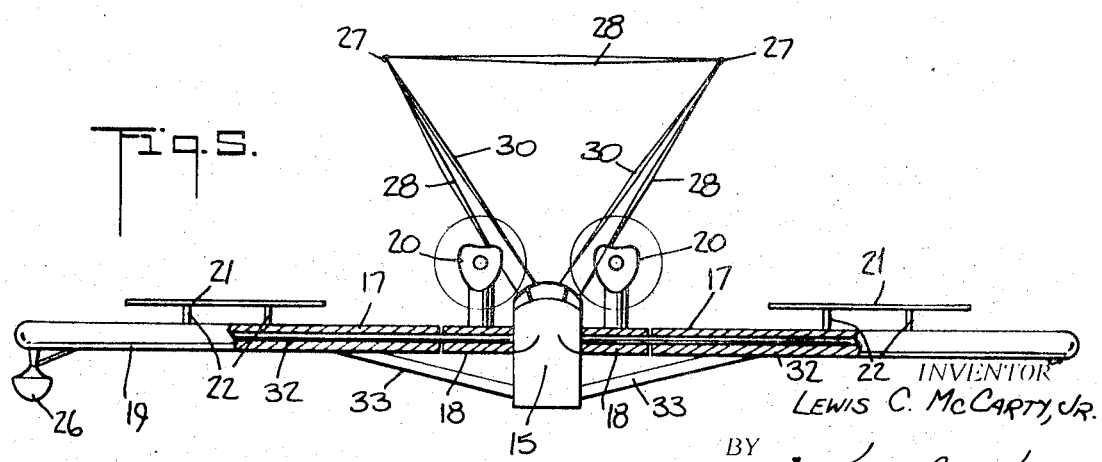

TANDEM WING AIRCRAFT WITH FREELY PITCHING WING SURFACES

This invention relates to an aircraft. More particularly, this invention relates to an aircraft having a tandem wing. Still more particularly, this invention relates to a tandem wing aircraft having wings free to articulate in pitch around an axis near the wing aerodynamic center.

Various types of aircraft have been known for purposes of transporting passengers or cargoes such as jetliners, propeller-driven airplanes, helicopters, etc. as well as for purposes of advertising such as blimps. While there have been numerous constructions for these aircraft, such as fixed wings, most of these aircraft have been designed with a view towards stability and control, stability being defined as that characteristic of a moving body which causes a return to an original state of attitude without application of control forces following a disturbance of the original state of attitude and control being defined as that characteristic which enables a pilot to fly in any path in any attitude for landing, takeoff or maneuvering. Thus, aircraft have been designed so that when they are disturbed from an equilibrium condition, or trim speed, they create forces and moments that tend to restore equilibrium. Also, the aircraft have been provided with controls which permit a pilot to impart the force necessary to effect the maneuver response desired.

Briefly, the forces acting on an aircraft of fixed wing construction when in a state of equilibrium include a downward gravitational force of weight, an opposed upward force of lift, a forward thrust usually induced from a power plant, and a rearward drag. In prior fixed wing art the wings of the aircraft usually constitute the major element of the lifting system. Thus, the wings have been designed so as to have the chord line of the wing at a particular angle of attack to the direction of airflow in order to effect a selected lift force. In this regard, it has been known that as the angle of attack, or coefficient of lift $C_L$, increases the lifting forces will increase up to a stall angle of attack, at which point the aircraft fuselage is subjected to awkward attitudes and often resultant high design stresses during recovery. The coefficient of lift, however, will decrease after passing the stall condition. Accordingly, such aircraft have been designed to be stable against occurrence of a stall condition. In addition, such aircraft have been provided with controls to prevent a stall condition from occurring. It has also been known that the drag forces, or coefficient of drag, increases rapidly as the stall angle of attack is approached and thereby slows the aircraft by reducing the effect of the thrust force by the cosine of the angle of the fuselage or thrust axis to the flight path.

In fixed wing aircraft designed in accordance with the above, should an upward gust of air be encountered, the angle of attack of the wing relative to the airflow increases. This causes a greater lift force creating a noseup pitching moment so that the aircraft is moved in an upward curvilinear path. However, since the drag force also increases, the forward thrust is reduced so that the aircraft speed becomes reduced below the trim speed. Depending on the designed stability of the aircraft, the aircraft can then return itself to equilibrium or it can be further slowed or speeded up by pilot control. To balance this noseup moment of the aircraft, horizontal tail sections or canard surfaces forward are provided since such are known to have the greatest counterbalancing nosedown effect on the aircraft. Usually, the position and size of the tail sections are sufficient to counteract the effects of an increase of lift on the wing; however, such also produces a change of stability at each speed. Therefore, pilot-controlled elevators are provided on the horizontal tail sections to change the tail lift coefficient and thus the equilibrium speed.

Because of the requirements for rotating the fuselage of an aircraft in order to accomplish lift and drag functions for maneuvering and for survival of gust turbulence, conventional fixed wing aircraft are severely limited as to length. Further, while variable incidence wings and flaps are known which provide small improvements in the aforesaid respects such are impractical to operate with adequate speed, especially in large aircraft.

In regard to aircraft of the type used primarily for advertising or for other uses requiring long fuselages and slow air speeds, such as blimps, and other airships, it has been found that the gust responses of such airships of great length require a basically improved and different configuration to provide improved control and reduced gust load factors. Further, with respect to the use of such airships for displaying advertisements, it has generally been costly to display an advertisement in the air due to such factors as the high operating costs of such airships, the limited audience area coverage of the airships, and the relatively low comprehension rates of flashed messages.

Accordingly, it is an object of this invention to improve the stability and control problems of aircraft particularly those of great length.

It is another object of the invention to isolate the basic lift and control system of an aircraft from the fuselage rotation with more rapid control response in lift and moment.

It is another object of the invention to greatly reduce any interaction and high structural stresses encountered by aircraft in turbulence.

It is another object of the invention to provide a novel configuration disposing the entire lifting surface of an aircraft in a manner which provides maximum control and maneuvering moments about the aircraft pitch axis as well as the aircraft rolling axis, thus eliminating the need for auxiliary tail or canard surfaces which constitute parasite drag and excess weight.

It is another object of the invention to provide improved freedom from accidental stall and to ameliorate the consequences of such stalls ans accelerate recovery for aircraft intended for continued optimum economy and endurance at low speeds.

It is another object of the invention to maintain constant coefficients of lift without automatic controls.

It is another object of the invention to use tandem wings of reduced span and cost without sacrificing induced drag, or conversely to provide large reductions of induced drag for a given span and weight.

It is another object of the invention to increase the control power of an aircraft on all axes with a minimum of auxiliary surfaces.

It is another object of the invention to provide an aircraft with large unobstructed display panels capable of providing such advertisements at relatively low cost.

It is another object of the invention to provide the minimum capital and operating cost and weight to carry electric signs and public information systems on an aircraft.

It is another object of the invention to provide an aircraft configuration suitable for continuous cruising at the most economic airspeed near stall without excessive burdens on a pilot's attention and endurance.

It is another object of the invention to provide a more efficient and economic aircraft particularly for transporting special purpose cargo.

Briefly, the invention provides an improved aircraft of substantial length which utilizes tandem lifting surfaces or wings, in order to achieve lift as well as stability and controllability. In addition, the lifting surfaces of the aircraft are mounted in a freely pivotal manner within large angular limits so that the entire lifting surfaces can be used for controlling the aircraft in flight.

In one embodiment, the aircraft is constructed with a forward set of lifting surfaces at the nose of a fuselage and a tandem or rear set of lifting surfaces at the rear of the fuselage. The forward set of lifting surfaces are independently free to articulate on suitable pitch axis bearings mounted on the fuselage frame so as to be able to pivot and are disposed to either side of a cabin. The rear set of lifting surfaces are similarly articulated to the fuselage frame. In order to provide thrust, power plants are mounted over each lifting surface for cooperation therewith; however, the power plants are rigidly secured to the fuselage frame and are independently mounted from the pivotal lifting surfaces so as not to couple with the pivoting inertia and mechanics of the lifting surfaces. Also, in order to control yaw, vertical tail surfaces and a rudder are mounted at the rear of the fuselage. The lifting surfaces are each provided with control surfaces rigidly mounted to pivot with the lifting surfaces which are operated through suitable linkages under the pilot's control. The control surfaces on pilot selection trim the angle of attack of the lifting surfaces so that desired lift and maneuvers can be achieved about the aircraft pitching and rolling axes. By means of the pitch articulation each of the four lifting surfaces float or feather at a constant angle of attack or lift coefficient regardless of fuselage attitude or gust, climb or descent until changed by pilot control. Safe articulation limit stops are provided to allow free movement through all normal and emergency operation of the aircraft. As is usual in prior art, movable rudders are mounted on the fixed vertical tail surfaces to control yaw. However, the novel means of pitch and roll control provided by this invention also provides greatly augmented yaw control by executing first roll and then pitch in the selected turn direction using well known but in this case much more effective piloting technique.

The operation of the aircraft is such that on takeoff, the pilot can increase the angle of attack of each of the four lifting surfaces simultaneously to obtain lift forces of sufficient magnitude to obtain takeoff with a relatively short distance without the delay required for fuselage rotation which is objectionable for long and large aircraft on takeoff and which on landing often places the pilot so high that precise judgement of altitude is difficult. However, since the operation of the aircraft is intended for endurance at low speed, the cruising angle of attack can be made so steep as to have the coefficient of lift approach stall. This allows a maximum lift to be obtained. The increased drag at such angles of attack is not significant to the aircraft since such is easily overcome at the low flight speeds used.

Once the aircraft is in flight and at the desired altitude, the lifting surfaces are trimmed into their cruise equilibrium position. Thereafter, should a gust change the angle of attack of the forward or rear lifting surfaces, the aircraft tends to remain stabilized with the fuselage level as the lifting surfaces automatically pivot up or down to maintain a constant angle to the relative wind and hence the lift forces tend to remain constant. Should unequal lift forces be imposed by turbulence on spaced pairs of lifting surfaces, for example, with a higher lift force on the forward surfaces with a horizontal gust, the pitching moment at the forward end of the aircraft may become greater than the oppositely directed pitching control moment at the rear end of the aircraft so as to cause a noseup pitching. However, the novel configuration of the aircraft of this invention has a powerful pitching control moment which my analysis and experimental tests show to be from three to five times more effective than prior art. Roll of the aircraft on pilot control is achieved by differential action of the right and left pairs of lifting surfaces similar to the differential action of the front and rear pairs of lifting surfaces which achieves pitch axis control of the aircraft. Roll control capability is likewise far greater than the prior art provides since the total lift moment is available for the roll as well as for the pitch axis.

Inherent stall freedom and rapid stall recovery is provided by this novel aircraft configuration due to the free articulation of the lifting surfaces at a constant lift coefficient or angle of attack without pilot attention. Also, a separate and extremely important further advantage in safety concerning the stall is uniquely made practical by my design in that the pilot control may be safely limited to stop positions which absolutely prevent a trim beyond either positive or negative stall of the limiting surfaces.

In conventional prior art designs such stop limits at the stall have proved unsuccessful because the rate of approach to stall proved an unsatisfactory and dangerous maneuverability limit. This slow rate with stall limit trim results again because of the high rotational inertia of the fuselage, power plant, cargo etc., which degrades flare out on landing.

The novel aircraft configuration, however, excludes all rotational inertia except the wing and associated parts and provides a safe rate of approach to the stall with foolproof stop limits on the pilot's trim control. This stall limit plus at the large ratio of length to span also eliminates spin dangers.

To further improve flying qualities an effective and novel controllable roll damping and lateral stability device consisting of a vertical airfoil is hinged on an axis substantially in the "X" plane and located near the upper extremity of the aircraft. This airfoil is further coupled in the roll control linkage in such a manner that side slip velocity or roll velocity or yaw components exert a stable and adjustable control and stability stick force and response on the aircraft.

In order to land the aircraft the controls are actuated to move the control surfaces on the lifting surfaces, to cause the lifting surfaces to change their angles of attack opposite to that for takeoff and a reverse operation from takeoff is conducted.

The aircraft, by thus using this novel tandem system of free pitching lifting surfaces, assures safe flying qualities for much longer fuselages than the prior art has offered. The lifting surfaces serve not only to stabilize the aircraft but also permit powerful control moments to be created in order to control pitching and rolling. Further, by isolating the basic lift and control system from the fuselage the interaction and high structural stresses otherwise encountered in turbulence are avoided.

Since the invention allows the construction and use of economic aircraft having ultralong fuselages, many other potential commercial and military uses will become evident. In one instance, advertising display panels can be mounted on the fuselage at a downwardly inclined slope for viewing from the ground. With such an arrangement, various types of message producing systems can be used to automatically flash messages across the fuselage. For example, a lamp array can be positioned along the fuselage at appropriate intervals to light up in a programmed sequence various lamps to effect a succession of letters or numbers. In such a way messages of up to a score of letters can be flashed for audience ground viewing over an extended land area. In other instances, the fuselage can be enclosed and provided with passenger seats to ferry large groups of "sight seeing" passengers. Advantageously, each passenger seat can be placed next to a window. Further, for rapid entry and egress for commuter service and emergency escape, the aircraft offers a new approach to the fuselage length ratio in passenger aircraft design. Also, the enclosed fuselage can be used to transport special cargoes such as long tubes for pipelines into isolated areas. For electronic surveilance, a low cost vehicle is available to carry various sensors, bifocally spaced at large distances for such missions as geomagnetic exploration, mine-sweeping, commercial T.V. channel density monitoring and the like.

These and other objects and advantages of the invention will become more apparent from the following detailed description and appended claims taken in conjunction with the accompanying drawings in which:

FIG. 1 illustrates a perspective view of an aircraft according to the invention with an advertisement display in place;

FIG. 2 illustrates a broken perspective view of an aircraft according to the invention with the fuselage free of display material;

FIG. 3 illustrates a side view of the aircraft of FIG. 2;

FIG. 4 illustrates a plan view of the aircraft to FIG. 2;

FIG. 5 illustrates a front view of the aircraft of FIG. 2;

FIG. 6 illustrates a view taken on line 6—6 of FIG. 3;

FIG. 7 schematically illustrates the change in the angle of attack of a wing of the aircraft of the invention;

FIG. 8 illustrates a schematic diagram of the lamp array for a fuselage panel for achieving maximum information dissemination with minimum power;

FIG. 9 illustrates a partially broken view of the mounting of a power plant to the fuselage relative to a wing of an aircraft of the invention;

FIG. 10 illustrates a side elevational view of a modified aircraft of the invention for use as a passenger or cargo aircraft;

FIG. 11 illustrates a view taken on line 11—11 of FIG. 10 showing a tiered passenger compartment for the passenger version of the aircraft of FIG. 10; and FIG. 12 illustrates a modified aircraft of the invention of a tandem wing triplane type for carrying extremely long continuous cargo items.

Referring to FIGS. 1 and 4, an aircraft 13 is constructed with a fuselage 14 of long length, for example, about 367 feet, forward and rear cabins 15, 15' rigidly connected to the ends of the fuselage 14, a pair of forward wings 16 on opposite sides of the forward cabin 15 and a pair of rear wings 17 on opposite sides of the rear cabin 15'. Each wing 16, 17 which is of known cross-sectional shape is constructed of a fixed section 18, 18' and a pivotal lifting surface 19, 19' and supports a power plant 20 on the fixed section 18, 18' for propulsion of the aircraft 13. The fixed sections 18, 18' of the forward and rear wings 16, 17 are secured to the respective cabins 15, 15'. Each of the pivotal lifting surfaces 19, 19' is provided with a control surface 21 which is fixedly mounted on a pair of struts 22 to the upper surface of the pivotal lifting surface 19, 19'. Each control surface 21 includes a pair of flaps 23, 23' which are pivotally mounted on the rear of the control surface 21 for purposes hereinafter described. Also, each of the power plants 20 on the rear wings 17 is provided with a vertical trail surface 24 fixed to the power plant and a rudder 25 pivotally mounted to the rear of the vertical tail surface 24. In addition, a landing pod 26 is mounted on the underside of each wing 16, 17 and provided with pontoons for landing on water or wheels for landing on land, or both.

Referring to FIGS. 2, 3, 4 and 6, the fuselage 14 is constructed with a triangular cross section of three longitudinally disposed strengthening tubes 27 which are spaced apart by chord members 28, for example, of tubular construction. The chord members 28 are rigidly connected to the strengthening tubes 27 to form a rigid truss frame. In addition, various stiffners 29 are connected between the strengthening tubes 27 and chord members 28 to further stiffen the truss frame. For example, a pair of crossed stiffners are disposed between each pair of adjacent chord members 28. In addition, a free feathering fairing 31 is rotatably mounted on the vertically inclined chord members 28 of the truss frame for reducing drag on the aircraft during flight as well as for reducing side or wind force on the fuselage 14 when the aircraft is moored on the ground. These fairings 31 are free to weathercock 360°.

The forward cabin 15 is connected to an extension of the lower strengthening tube 27 of the fuselage truss frame which passes through the forward cabin 15. In addition, a plurality of interconnected struts 30 connect the forward cabin 15 to the upper strengthening tubes 27 of the fuselage truss frame in order to rigidly connect the cabin 15 to the fuselage 14.

Referring to FIGS. 1 and 9, the aircraft also includes a pair of transverse shafts 32 which are fixed to the ends of the fuselage truss frame and pass through the wings 16, 17. Each transverse shaft 32 rotatably mounts the pivotal lifting surfaces 19, 19' thereon through suitable bearings (not shown) for pivoting relative to the fixed sections 18 and fuselage 14. In addition struts 33 are secured to opposite sides of the forward and rear cabins 15, 15' and journaled to the transverse shafts 32 to further support and stiffen the transverse shafts 32.

The forward and rear lifting surfaces 19, 19' are mounted on the respective transverse shafts 32 in a manner so as to be freely pivotable about the axis of the transverse shaft 32 in a range of angles from +40° to −30° with respect to the horizontal.

Referring to FIG. 1, the power plants 20 are of similar construction to each other and are of known propeller design.

The lifting surfaces 19, 19' are dynamically and statically balanced in suitable degree about the pivot axis of the aircraft 13 and are controlled by the pilot in the forward cabin through the control surfaces 21. The lifting surfaces 19, 19' are suitably sealed with respect to the fixed sections 18, 18' of the wings 16, 17 while the shafts 32 are also sealed with respect to the fixed sections 18, 18'. This presents a substantially continuous exterior surface over the wings so as to prevent leakage of foreign matter such as water or oil into the interior of the cabin or lifting surfaces.

Referring to FIG. 7, the lifting surfaces 19, 19' are each shaped in a conventional wing shape to have a chord line 34 passing through the axis of the shaft 32 which presents an angle of attack to the direction of airflow.

Referring to FIG. 1, the forward and rear wings 16, 17 are spaced apart by a minimum distance of from 3 to 5 times the wing span. This reduces the induced drag of the rear wings 17 resulting from the downrush of the forward wings 19 to insignificant proportions.

Also, when used for advertising purposes, the aircraft 13 is provided with a plurality of display panels 35 secured to the inclined sides of the fuselage 14. The panels 35 are preferably sized to extend across one bay of the fuselage 14, that is, between a pair of adjacent chord members 28, and are oriented by the fuselage for viewing from the ground.

In operation, with the aircraft 13 in flight and in equilibrium, the lifting surfaces 19, 19' are disposed as shown in solid lines in FIG. 7. Upon occurrence of a gust of wind which changes the direction of airflow on the lifting surfaces 19, 19' to that shown by line 35, instead of the angle of attack increasing with a consequent increase in lift, the lifting surfaces are pivoted in counterclockwise direction on the shafts 32 into the dotted line position to maintain the angle of attack substantially constant. Thus, the lift is maintained constant so that the aircraft remains in equilibrium.

In order to control the aircraft, the flaps 23, 23' on the lifting surfaces 19, 19' are operated through mechanical controls such as through servo linkages and conventional cockpit controls under the control of the pilot. For sake of simplicity, these mechanical controls are not shown; however, it is noted that the pilot utilizes a known control column constructed of a wheel and yoke in a known manner to effect control of the aircraft. For example, in order to change altitude, for example, to climb, the pilot pulls back on the control column which is operatively connected to the control flaps on the front and rear lifting surfaces to rotate these lifting surfaces in opposite fashion. As the control flaps on the front and rear lift surfaces rotate in opposite fashion to the same degree, the angle of attack of the forward lifting surface 19 increases to cause an increase in the lift forces while the angle of attack of the rear lifting surfaces 19' decreases to cause a decrease in the lift forces. The aircraft is then pitched noseup due to the lifting forces causing pitching moments at front and rear which rotate the aircraft in clockwise direction as viewed in FIG. 3 about the center of gravity.

A pilot is thus able to control the aircraft in a manner to produce a collective lift control by an auxiliary trim wheel or lower which results in a level trim attitude or to produce a differential lift control which results in a change in fuselage attitude. Further, the longitudinal control of the aircraft which is obtained is substantially more powerful than that obtained in conventional fixed wing aircraft.

In the event that a pilot desires to effect a roll, the wheel of the control column is rotated, for example, clockwise. As the lifting surfaces 19, 19' on the right side of the aircraft are controlled through the control column to rotate in opposite direction to the lifting surfaces 19, 19' on the left side of the aircraft, the angle of attack of the lifting surfaces on the right side decreases to reduce the lift forces while the angle of attack and lift forces increases on the left side. This unbalance causes a couple which rotates the aircraft about its longitudinal axis to achieve the desired roll.

In order to control the yaw of the aircraft, a vertical fins or the rudders 25 on the vertical tail surfaces 24 are operated by a pilot-actuated control system (not shown) in a known manner and therefore their operation is not further discussed.

Referring to FIG. 8, where the aircraft is used for advertising display, especially for nighttime viewing, a suitable light display arrangement can be mounted on the fuselage for flashing a message to a ground level audience. For example, a lamp array 37 is provided on each bay of the fuselage and is constructed with lamps 38, as shown, which are actuated to flash a letter or number of a message being disseminated. The lamps 38 are operated on minimum power with circuitry adapted with computer binary characteristics. The lamp array 37 is designed to produce characters of substantial height, for example, 20 feet, so as to be seen and comprehended over substantial land viewing areas. For example, for letters of 20 feet height with 18 letters in 324 feet, the message can be flashed at an altitude of 3,000 feet to cover an area of 4.6 square miles to either side of the aircraft. Also, the aircraft allows a higher comprehension of the flashed words of a message, for example, about 90 words per minute.

Referring to FIGS. 10 and 11, in order to transport passengers, for example, in a triple deck arrangement of seats 41 with each passenger seat next to a window, the fuselage 14' of the aircraft 13' is provided with an enveloping rigid skin 42 which is braced by a suitable truss frame (not shown). The remainder of the aircraft structure is similar to that described above and like reference characters have been used to indicate like parts.

Referring finally to FIG. 12, in order to transport special cargoes of great length such as extruded plastic pipelines, three pairs of wings including lifting surfaces 43 and power plants 44 as above are mounted within the plane of the fuselage 14'. The three lifting surfaces 43 are constructed and are controlled in the same fashion as described above. In this embodiment, depending on the position of the center of gravity of the aircraft 13'', the middle lifting surface acts in the same direction as the forward lifting surface or the rear lifting surfaces. That is, if located to the rear of the center of gravity, the middle lifting surfaces operates identically to the rear lifting surface.

The invention thus provides an aircraft which is stable both statically and dynamically through the design of the lifting surfaces along the fuselage and the tail section and which is controllable to a large degree through use of the entire lifting surfaces for pitch and roll control.

According to the invention, the pivoting motion of the lifting surfaces 19, 19' of the wings is controlled by means of the wing control surfaces and flaps, which effect a stable trim to a constant lift coefficient selected by the pilot. Further, since the free pitching lifting surfaces have a very small inertia about the pivot axis, the lifting surfaces respond promptly to a gust of wind to adjust to the new resultant velocity vector caused by the gust while still providing a constant lifting.

The structure presented by the invention allows a pilot to mechanically effect a large power response with relatively little effort in controlling the aircraft during flight. For example, in controlling the pitching of the aircraft of the invention, it has been found that the invention effects a pitching control moment nine times greater than conventional fixed wing craft. This is due to the availability of using the entire lifting surfaces forward of the center of gravity of the aircraft and the entire lifting surfaces to the rear of the center of gravity in producing control moments. Further, these control moments are developed to be of the same size or direction so that a cumulative movement effect is produced. Also, it has been found in the case of a gust of wind or other turbulence that the aircraft of the invention provides an even more powerful control. This occurs since the static moment as well as the inertia stabilization is also available in counteract the unbalancing forces imposed by the gust. The aircraft is thus returned to trim speed with much less effort on the pilot's part.

For example, in analytically comparing an aircraft according to the invention and a conventional aircraft having a fixed wing near the center of gravity and a tail section with respect to control power and gust survival in turbulence, it has been found that the aircraft of the invention provides significant advantages. In the case of control power and reserve margin to maintain a fuselage at level attitudes when encountering a gust of wind, the invention provides an aircraft with about 4.5 times the control power of the conventional aircraft in gust turbulence. Further, in the case of pitch control the relative mass moment of inertia $I_y$ about the pitch axis of the aircraft provided by the invention is 3 to 4 times that of the conventional aircraft. This is due to the fact that in a conventional aircraft most of the weight is very near the center of gravity with the exception of the fuselage and contents weight and the tail surfaces weight which amounts to about 40 percent to 60 percent of the total weight whereas with the invention a great amount of weight exclusive of the fuselage is disposed at the extremities of the fuselage. This provides the pilot with a very powerful inertial damping force which tends to delay any disturbance as a gust of wind from deflecting the aircraft from its level pitch attitude. Also, in the case of maneuver rate or a certain angular velocity per unit time, although the high inertia of the aircraft acts in opposition to the pilot's control forces applied by differential lift control of the forward and rear wings, the pilot has a greater margin than with the conventional aircraft due to the significantly greater control power available.

It is also noted that the more powerful control for the pitch axis can be transferred to the yaw axis by the pilot's combination of the roll control. Also, a powerful roll control is provided by the differential action of the opposed pairs of wings when all the lifting surface are used to oppose asymmetric gusts.

It has also been found that positive dynamic and static yaw and pitch stability are secured from the open frame of the fuselage by locating the center of gravity one to two bays forward of the midpoint. This use of "parasite" static stability and damping allows reduction in the vertical tail area as well as in the weight of the aircraft.

Because of the large lift forces and resultant pitching control moments which can be effected to control the angle of attack of the respective lifting surfaces, without the need for fuselage rotation the aircraft is able to takeoff within relatively short distances at relatively low speed. For example, an aircraft as shown in FIG. 2 above, having an overall length of 377 feet, a tip-to-tip lifting surface span of 69 feet, four engines of 100 hp., each for the power plants, and a weight of about 3 to 4 tons, can takeoff from a landing strip within about 300 feet at a speed of from 35 to 40 m.p.h. A similar aircraft can takeoff from water in about 374 feet.

Since the aircraft of the invention is designed for endurance at low speeds, for example, at a minimum speed of 46 m.p.h., a ferry speed of 76 and a cruising speed of 55, the coefficient of lift can be maintained as close as possible to the stall with the result that the aircraft becomes efficient and economical to operate. Also, since the aircraft is equipped with controls which can be quickly and easily operated, should the aircraft lifting surfaces move into a stall condition due to turbulence, the pilot can easily return the aircraft to trim with a relatively small effort. The range of the above exemplified aircraft is about 300 miles with a ceiling of about 8,000 feet.

It is noted that the aircraft is able to continue flight with any two power plants operating such that aircraft designed in accordance with the invention can have 2 or more engines mounted thereon. That is, the invention is not limited to a 4-engine craft as illustrated in FIG. 1.

When the aircraft is used for advertising purposes, as shown in FIG. 1, a wide area of audience coverage can be obtained. In view of this factor as well as the fact that the messages flashed on the fuselage panels are capable of a high message comprehension rate, the advertising effectivity of the invention is greatly increased over conventional aircraft. For example, as compared to conventional airships, the invention provides as much as 20 times the advertising effectivity.

When used in ferrying passengers, the aircraft of the invention allows each passenger to be seated next to a window. Since the range of such an aircraft is limited as noted above and the speed is relatively low, such aircraft are designed primarily for ferrying large groups of passengers over relatively short distances. For example, such aircraft can be used between the airports of a large city.

When used in ferrying special cargoes, the aircraft allows continuously extruded plastic and aluminum pipes to be flown to pipeline sites so that the number of joints in the finished pipeline can be substantially reduced.

It is further noted that the various control flaps of the aircraft are selectively controlled through servo linkages and conventional cockpit controls. Also, when the lifting surfaces are collectively controlled in the same sense, to effect a change in the lift forces, no pitching moment is produced since the pitching moments produced by the lift forces cancel each other. Similarly, where pairs of lifting surfaces are differentially controlled in opposite sense, a maximum pitching or rolling moment is obtained.

Since the aircraft of the invention is of substantial length and has a limited range, the aircraft requires dismantling for transportation to locations situated at great distances. However, it has been found that an aircraft such as shown in FIG. 2, can be shipped in a relatively compact manner, for example, within 11 boxes of 116 total cubic tons.

It is also noted that since power plants of the aircraft are spaced apart a substantial distance, the backwash of the forward power plants does not effect the rear power plants.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. An aircraft comprising
   a fuselage having a rigid truss frame of triangular cross section;
   a plurality of display panels mounted along a pair of opposite sides of said truss frame; and
   a lifting and control system mounted on said fuselage for causing flight of said fuselage, said system including a pair of first lifting surfaces pivotally mounted at the forward end of said truss frame transversely of said fuselage, a pair of tandem lifting surfaces pivotally mounted at the rear end of said truss frame transversely of said fuselage, control flaps on each lifting surface for controlling the angle of attack of each lifting surface, and means for operating said control flaps to effect a change in the angle of attack of said lifting surfaces.

2. An aircraft as set forth in claim 1 wherein each said lifting surface is limited to pivot in a range of from +40° to −30° relative to the plane of said fuselage.

3. An aircraft as set forth in claim 1 further comprising a cabin mounted on the forward end of said truss frame between said forward lifting surfaces.

4. An aircraft as set forth in claim 1 further comprising thrust means mounted on said fuselage for causing propulsion of said fuselage.

5. An aircraft as set forth in claim 1 wherein each said display panel includes a lamp array for effecting illumination of one character of a series of characters in programmed sequence.

6. An aircraft as set forth in claim 1 wherein said truss frame includes a first transverse shaft at the forward end thereof and a second transverse shaft at the rear end thereof, said first lifting surfaces being pivotally mounted on said first shaft and said second lifting surfaces being pivotally mounted on said second shaft.

7. An aircraft as set forth in claim 6 further including a cabin mounted at the forward end of said fuselage over said first shaft wherein said first lifting surface is formed of a pair of surfaces disposed on opposite sides of said cabin and said tandem lifting surfaces is formed of a pair of surfaces disposed to opposite sides of said fuselage.

8. An aircraft as set forth in claim 7 wherein said means for operating said control flaps is articulated to said control flaps to cause independent pivoting of each said surface of said lifting surfaces whereby pivoting of said surfaces of said first lifting surface in the same sense and pivoting of said surfaces of said tandem lifting surface in the opposite sense causes pitching of the aircraft and pivoting of said surfaces on one side of said fuselage in opposite sense to pivoting of said surfaces on the opposite side of said fuselage causes rolling of the aircraft.

9. An aircraft as set forth in claim 1 wherein each said lifting surface is freely pivotally mounted with respect to said fuselage.

10. An aircraft as set forth in claim 9, wherein said lifting surfaces are free to pivot between an angle of +40° and an angle of −30° relative to the horizontal.

11. An aircraft comprising
    a fuselage of extended length;
    a cabin mounted at the front of said fuselage;
    a pair of first lifting surfaces mounted on opposite sides of said cabin in freely pivotal relation thereto about an axis transverse to said fuselage;
    a pair of tandem lifting surfaces mounted on opposite sides of said fuselage at the rear thereof in freely pivotal relation thereto about an axis transverse to said fuselage;
    a propulsion system including at least two power plants rigidly mounted on said fuselage for causing thrust;
    a control flap pivotally mounted on each of said lifting surfaces to the rear thereof, said control flap being pivotally mounted on the rear of a control surface mounted on a pair of upstanding struts on the rear of a lifting surface, and
    control means connected to each said control flap for pivoting said control flap relative to said lifting surface to cause pivoting of said lifting surface, said control means being actuated from within said cabin and passing through each said lifting surface.

12. An aircraft as set forth in claim 11 wherein said control means includes a control column in said cabin and a servo linkage connecting said control column independently to said control flaps.

13. An aircraft as set forth in claim 11 further comprising fairing means on said fuselage for laterally stabilizing said fuselage against roll.

14. An aircraft as set forth in claim 13, wherein said fuselage includes a plurality of longitudinally disposed tubes and a plurality of chord members interconnecting said tubes in spaced apart relation and wherein said fairing means are mounted on said chord members disposed vertically.

15. An aircraft as set forth in claim 11, wherein said fuselage is formed of an open truss frame including a plurality of longitudinally arranged tubes and a plurality of transversely arranged chord members interconnecting said tubes together in rigid manner.

16. An aircraft as set forth in claim 15 wherein said chord members divide said fuselage into a plurality of bays and wherein the center of gravity of the aircraft is positioned at least one bay beyond the center of said fuselage.

17. An aircraft as set forth in claim 16, further comprising fairing means rotatably mounted on a plurality of said chord members for reducing drag on said fuselage.

18. An aircraft as set forth in claim 11 which further comprises a landing pod depending from each of said lifting surfaces.

19. An aircraft as set forth in claim 11 wherein said first lifting surfaces are spaced from said tandem lifting surfaces a distance of at least three to five times the span of said first lifting surfaces.

20. An aircraft as set forth in claim 11 wherein said fuselage includes a plurality of decks of seats and a rigid skin enveloping said seats.

21. An aircraft as set forth in claim 11 further comprising a middle pair of wings mounted on said fuselage, each wing of said middle pair of wings including a freely pivotally lifting surface and control means on each lifting surface for changing the angle of attack of said lifting surfaces.

22. An aircraft comprising
a fuselage of extended length;
a cabin mounted at the front of said fuselage;
a pair of first lifting surfaces mounted on opposite sides of said cabin in freely pivotal relation thereto about an axis transverse to said fuselage;
a pair of tandem lifting surfaces mounted on opposite sides of said fuselage at the rear thereof in freely pivotal relation thereto about an axis transverse to said fuselage;
a propulsion system including at least two power plants rigidly mounted on said fuselage for causing thrust;
a control flap pivotally mounted on each of said lifting surfaces to the rear thereof, said control flap being pivotally mounted on a pair of upstanding struts on the rear of a lifting surface; and
control means connected to each said control flap for pivoting said control flap relative to said lifting surface to cause pivoting of said lifting surface, said control means being actuated from within said cabin and passing through each said lifting surface.

23. An aircraft comprising
a fuselage;
a cabin at the forward end of said fuselage;
a forward pair of wings mounted on said fuselage on opposite sides of said cabin;
a rear pair of wings mounted on the rear of said fuselage;
each of said wings including a fixed section extending from said fuselage and a pivotally mounted lifting surface extending from said fixed section;
a control surface mounted on each of said lifting surface, each control surface being spaced from a respective lifting surface and including at least one flap pivotally mounted thereon,
a power plant mounted on each of said fixed sections of said wings for propelling the aircraft;
a vertical tail section fixedly mounted to the rear of each of said power plants on said rear pair of wings;
a rudder pivotally mounted on each said vertical tail section; and
control means for pivoting each said rudder relative to said fuselage to control the yaw of the aircraft.

24. An aircraft comprising
a fuselage of extended length;
a cabin mounted at the front of said fuselage;
a pair of first lifting surfaces mounted on opposite sides of said cabin in freely pivotal relation thereto about an axis transverse to said fuselage;
a pair of tandem lifting surfaces mounted on opposite sides of said fuselage at the rear thereof in freely pivotal relation thereto about an axis transverse to said fuselage;
a pair of upstanding struts on the rear of each lifting surface, a control surface mounted on each pair of upstanding struts, and a control flap pivotally mounted on the rear of each respective control surface and to the rear of the respective lifting surface; and
control means connected to each said control flap for pivoting said control flap relative to said lifting surface to cause pivoting of said lifting surface, said control means being actuated from within said cabin and passing through each said lifting surface.